United States Patent [19]

Might

[11] 4,060,061
[45] Nov. 29, 1977

[54] PROCESS AND APPARATUS FOR IMPROVED I.C. ENGINE COMPOSITION

[76] Inventor: Willard C. Might, 393 N. Jay St., West Milton, Ohio 45383

[21] Appl. No.: 615,179

[22] Filed: Sept. 19, 1975

[51] Int. Cl.$^2$ ............ F02B 75/02; F02D 39/02; F02M 7/12
[52] U.S. Cl. .................. 123/75 B; 123/26; 123/119 D
[58] Field of Search ............ 123/119 D, 32 E, 26, 123/75 B, 119 A

[56] References Cited

U.S. PATENT DOCUMENTS

| | | | |
|---|---|---|---|
| 923,491 | 6/1909 | Coffee | 123/75 B |
| 982,251 | 1/1911 | Coffee | 123/75 B |
| 1,562,692 | 11/1925 | Rochefort-Lucay | 123/75 B |
| 1,896,163 | 2/1933 | Champion | 123/75 B |
| 2,112,751 | 3/1938 | Thomas | 123/75 B |
| 2,995,890 | 8/1961 | Dolza | 123/26 X |
| 3,141,448 | 7/1964 | Candelise | 123/26 |
| 3,650,261 | 3/1972 | Hutsell | 123/26 X |
| 3,735,740 | 5/1973 | Hunt | 123/26 |
| 3,814,065 | 6/1964 | Gospodar | 123/26 |
| 3,898,965 | 8/1975 | Fischer | 123/119 D |
| 3,925,989 | 12/1975 | Pustelnik | 123/119 A X |
| 3,964,451 | 6/1976 | Goto | 123/75 B |

Primary Examiner—Ronald H. Lazarus
Assistant Examiner—Ira S. Lazarus
Attorney, Agent, or Firm—Biebel, French & Nauman

[57] ABSTRACT

A process and apparatus are disclosed for improving the efficiency of combustion in a spark ignition four cycle internal combustion piston engine. After a fuel-air charge is inducted into the cylinder(s), gas is injected at moderate pressure into the cylinder at a level below the spark plug, while the pressure in the cylinder is low. Preferred gas injection timing is from about the time the piston completes the intake stroke until the piston is about half-way through its compression stroke. Air and/or engine exhaust may comprise the injected gases. Valves and conduit for controlling the injection are provided as a sub-assembly which can be fitted to existing engines and use the engine camshaft for correct actuation.

6 Claims, 5 Drawing Figures

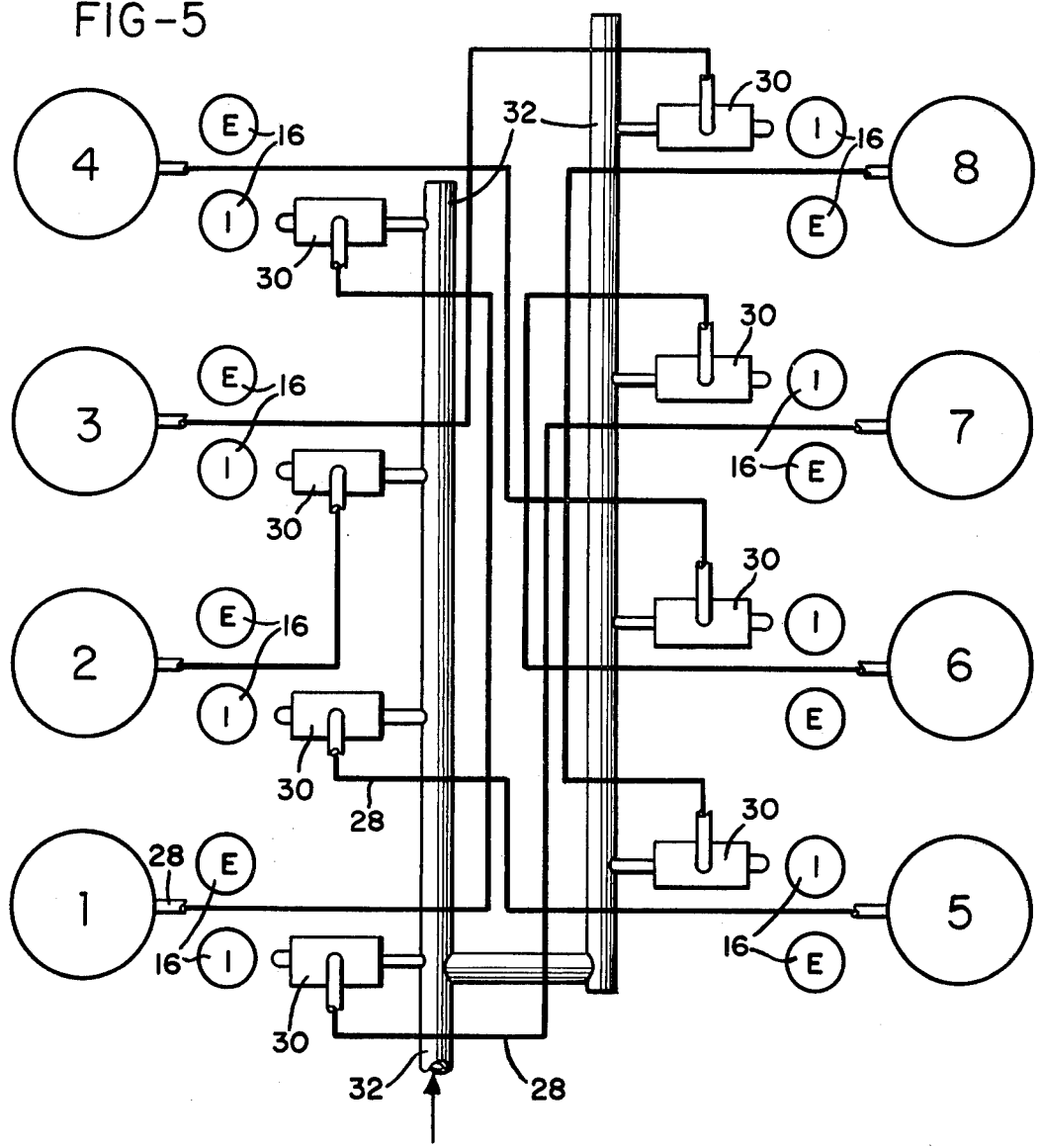

PROCESS AND APPARATUS FOR IMPROVED I.C. ENGINE COMPOSITION

BACKGROUND OF THE INVENTION

This invention relates to improvements in internal combustion engines operating on the Otto or four-stroke cycle, particularly to improvement of engine efficiency with minimum cost and change in present engine design and carburetion.

Various proposals have been made to improve the combustion efficiency of such engines, more recently directed toward reduction of unburned hydrocarbons and $NO_x$ in the exhaust emissions of the engine. Stratified charge and so-called "lean burn" engines are in various stages of development, and many of these trace their history to work done in the 1920's by Sir Harry Ricardo. A number of approaches have been reported, a typical summation appearing in *Popular Science*, July 1975, pages 56 et seq., and one engine in particular, the Honda CVCC engine is commercially available. It is a relatively small (75 cubic inch) four cylinder engine utilizing two separate intake valves and an inlet manifold and carburetor system which introduces a rich mixture in small amounts, then a leaner mixture.

While these proposals do in fact work, they are not easily adaptable to the much larger displacement engines used in the U.S. automotive industry. Cost is an important consideration in making any major engine design change, and future cost and acceptability is part of such consideration.

Prior art patents have suggested injection of air into the cylinder of such engines for various reasons. U.S. Pat. No. 2,011,986 discloses auxiliary air injection before and during combustion. It states that air injection should start near the middle of the compression stroke and end in the beginning of the firing stroke. U.S. Pat. No. 2,991,766 suggests injecting air into the cylinders during the expansion (power) stroke, and possibly continuing into the exhaust stroke. U.S. Pat. No. 2,994,310 suggests injecting air in the region near the spark plug during the period immediately following ignition. U.S. Pat. No. 3,019,777 also suggests air injection during the expansion stroke, entering around the spark plugs, and uses the ignition timing of related cylinders to control solenoid operated air valves to achieve the desired timing.

Another related approach is disclosed in U.S. Pat. No. 3,182,645, wherein air is injected just before ignition allowing the rich mixture around the spark plug to ignite before the injected air leaves the mixture. A dual land piston is used for air compression, together with special designs of piston top and cylinder head, requiring a completely reconstructed engine. U.S. Pat. No. 3,735,740 also teaches air injection around the spark plug just before firing, at the end of the compression stroke.

U.S. Pat. No. 3,792,691 discloses a spark ignition supercharged engine with twin exhaust valves, using injected Diesel fuel. It provides ports for additional air admission during the latter part of the intake stroke and beginning of the compression stroke, and again during the latter part of the power stroke and beginning of the exhaust stroke. This engine utilizes an exhaust gas turbo-supercharger and employs after-burning of gases in the exhaust manifold.

It will be noted that the various proposals set forth in the above mentioned earlier patents are somewhat contradictory, but it is believed that this may be due to different approaches to the complex problems of spark ignition Otto cycle engines, and to the many compromises in fuel-air mixing and supply which have been made in order to provide reliable high power automotive service, which inherently demands a wide range of engine speeds and power. With increasing emphasis on fuel economy and emmission control, these compromises are no longer desirable, but still there is a need for wide speed and power ranges, together with a need to adapt present engines so as to minimize tooling and improvement costs.

SUMMARY OF THE INVENTION

The present invention provides a unique and relatively simple way to inject air and/or gases (such as exhaust emission containing unburned hydrocarbons) into the cylinders of an Otto cycle engine, particularly an engine for automotive service. Air injection is commenced after the intake valve closes and the inducted charger has entered the cylinder, preferably at about the time the piston is near bottom dead center (BDC) and l.g. about to begin its compression stroke. The air is injected at relatively moderate pressure, is three to four atmospheres or about 40 to 60 p.s.i.g. Injection continues until the pressure in the cylinders during the compression stroke exceeds this value, which is usually about halfway or at little more through the compression stroke, around 270° of crank rotation for the piston.

The air injection port is located in the side of the cylinder, spaced a substantial distance below top dead center (TDC) piston position. Thus, the port is covered at the beginning of ignition and for a time thereafter. Preferably the port is above the location of the piston's oil ring at TDC, to minimize trapping oil in the port. The port is below the valve seat level, and opposite the spark plug, such that injected air tends to fill the lower portion of the cylinder above the rising piston, but does not appreciably affect the fuel-air ratio of the inducted mixture around the spark plug. Thus, while the overall mixture is lean at the time of ignition, it is sufficiently rich near the spark plug for effective ignition, and the engine does not exhibit any tendency to misfire. Apparently, the ignition and flame propagation during combustion is of the type characteristic of a stratified charge arrangement, although it has not been possible to study this in depth. Also, successful operation has been achieved using exhaust gases recirculated through the air supply compressor from the engine exhaust.

The timing for selective supply of pressurized air from the engine driven compressor is derived from a set of air inlet control valves which are actuated in correct sequence, and opened for the desired duration, by mechanism controlled from the engine camshaft. In a preferred embodiment this mechanism is designed to fit over the camshaft of a V-8 engine, between the lifters for the overhead valve mechanism, and to derive timing and driving power from these lifters. The inlet valve lifter for a cylinder two later in the firing order gives the required timing, for example, with a firing order of 1-5-4-2-6-3-7-8, the intake lifter for cylinder No. 4 controls the air inlet valve for cylinder No. 1, etc. Thus, the necessary mechanism can easily be added to present design engines.

The primary object of the invention, therefore, is to provide a method and apparatus for engine operation in which air and/or gases are injected into the cylinder (s) of the engine under moderate pressure, while the piston is in the initial part of its compression stroke; to control this injection via the existing engine valve mechanism; thereby to supercharge the engine from a relatively moderate pressure source; to provide a subassembly which is easily added to present engine designs to provide the desired air injection control; and to achieve the foregoing objects in a simple and inexpensive manner.

Other objects and advantages of the invention will be apparent from the following description, the accompanying drawings and the appended claims.

BRIEF DESCRIPTION OF THE DRAWINGS

FIG. 5 is a schematic layout of the air valving.

DESCRIPTION OF PREFERRED EMBODIMENT

Figure 1:
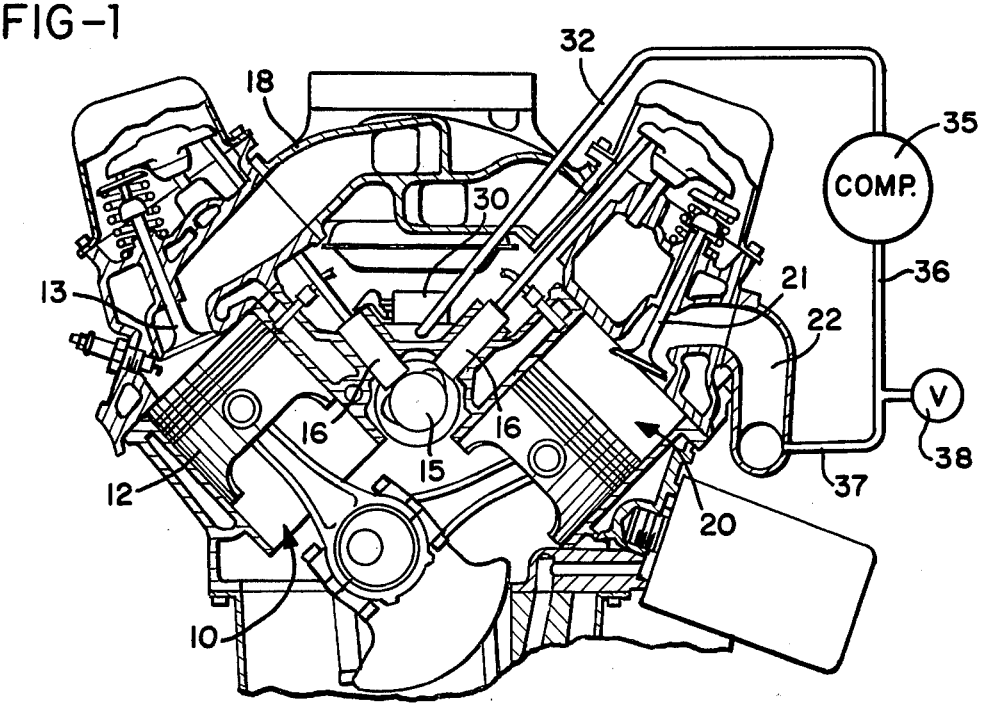
FIG. 1 is a cross-sectional view through a conventional V-8 automotive engine fitted with the improvements of the invention.

FIG. 1 illustrates from the front a conventional engine to which the invention is applicable. For purposes of explanation the engine layout corresponds generally to a V-8 engine of the Ford Motor Company, having a displacement of 289 cu. in., since an engine is utilized in an actual embodiment. The drawing shows cylinder No. 1 at 10, with its piston 12 in top dead center (TDC) location, together with the spark plug and the intake valve 13 for that cylinder.

Camshaft 15 is located in the center of the engine and operates hydraulic valve lifters 16 which in turn control the valve mechanism of the engine. The intake manifold 18 is mounted over the cam shaft, lifters, and lower ends of the push rods, defining a space or gallery in the center of the V-shape of the engine. Intake manifold 18 covers this space and connects the carburetor (not shown) to the intake valves.

Cylinder No. 5 is shown at 20, together with its opened exhaust valve 21 leading to the left side exhaust manifold 22. The right side exhaust manifold is omitted for purposes of simplifying the drawing, as are other engine parts, and some details of the valve train are shown, but not specifically described since these are all conventional and not essential to an understanding of the invention.

The primary purpose of the invention is to add air or gas, or a mixture of these, into the engine cylinders at a time when each piston is commencing its compression stroke. Four stroke, or Otto cycle engines, most commonly used in automotive and stationary power service, operate with their intake manifold under sub-atmospheric pressure (unless supercharged). Even under full load open throttle conditions there is some vacuum in the intake manifold. In a carbureted engine this draws the fuel-air charge into the cylinders, or in a fuel injected engine just air will be so inducted and fuel will be injected into the intake manifolding, or directly into the cylinders, depending on the type of system used. Thus, the air-fuel charge in the cylinders at bottom dead center (BDC) of the pistons is at a sub atmospheric pressure and during the compression stroke the pistons compress the charge to in the order of 120–130 p.s.i.g., depending on the particular engine design.

Figure 2:
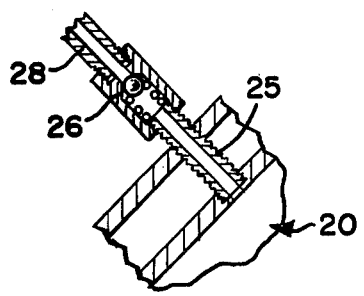
FIG. 2 is a detailed sectional view of the connection for injecting air or gas into the engine cylinder.
Figure 3:
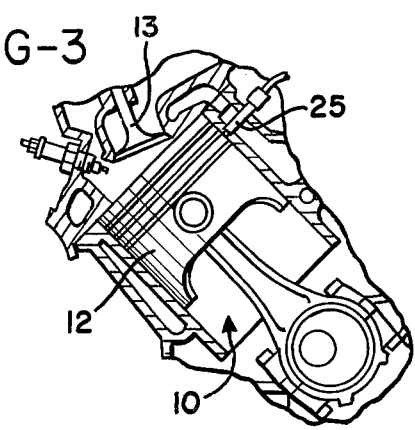
FIG. 3 is a somewhat schematic view showing the system as applied to one cylinder.

As shown in FIGS. 2 and 3, in the present invention an air inlet fitting is attached through the cooling jacket of each cylinder. This is in the form of a pipe or tube 25 which opens into the cylinder, preferably in the region between the lowermost compression ring and the oil control ring of the piston when the piston is at TDC. In the particular engine used and shown, this location is approximately one inch below the top edge of the cylinder.

Each pipe 25 is connected through a check valve 26 to an air supply conduit 28 which leads to an air inlet control valve 30. The valves 30 (one for each cylinder) are normally closed and are opened at a predetermined time, and for a predetermined interval, to supply air (or gas) under pressure into the corresponding cylinder. The check valves 26 are not essential, but are desirable to keep combustion gases out of conduits 28 and to protect the valves 30 from the heat and pressure of these gases.

Air or gas is supplied to the valves 30 from a manifold 32 (FIG. 5) which is connected to the output of a compressor 35 (FIG. 1). The compressor can be engine driven, and may have a storage tank and/or relief valve (not shown) appropriatley connected to its output to asssure an adequate supply of air or gas at the desired constant pressure, particularly under conditions of heavy engine loads and slow speed.

The compressor inlet 36 may be from a convenient source of clean cool and dense air in or near the engine. Optionally, at least a portion of the inlet to the compressor can be derived from the exhaust gas system of the engine, which is known to contain some unburned hydrocarbons. Such a connection is shown schematically at 37 in FIG. 1, however, it should be understood that this connection should be made to a point in the exhaust system where the gases have reduced in temperature, and a check valve 38 may need to be fitted to prevent escape of exhaust gases through the compressor inlet to atmosphere if the source of such gases is under any substantial pressure. It is anticipated that the pressure of the exhaust gases, if this optional feature is used, would be so slight that the check valve would not be necessary.

The control for sequential operation of valves 30 is conveniently derived from the cam shaft via the valve lifters 16. It is a feature of the invention to inject air, gas, or a mixture of the two during the later portion of the expansion stroke and particularly during the initial part of the compression stroke in each cylinder. In the particular engine described, the control functions as follows The firing order of the V-8 engine is 1-5-4-2-6-3-7-8. The valve timing is such that the inlet valve opens 16° BTDC and closes 70° ATDC, referring to degrees of crankshaft rotation for piston 12. The first four pistons in the firing order are separated, or out of phase, by 90°. Thus, the inlet valve lifter for cylinder No. 4 is beginning to open at 164°, and closes at 250°. It will be seen that this timing is slightly before piston 12 reaches BDC (180°) and when that piston is about halfway through its compression stroke (270°).

Figure 4:
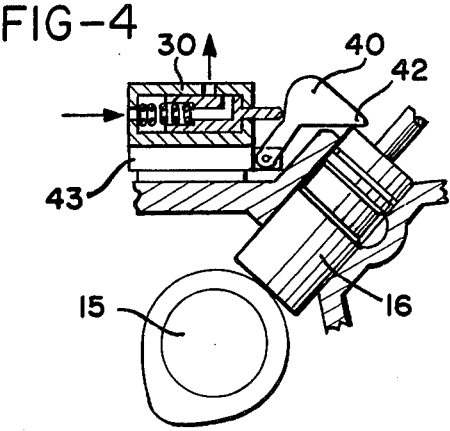
FIG. 4 shows details of the air valving operated from the engine cam shaft and valve lifters.

Referring to FIGS. 1 & 4, there is a pivotally mounted operating arm 40 for each valve 30. This arm includes a tip 42 which rests upon and is moved by a valve lifter 16. In the case of the valve 30 for cylinder No. 1, its control valve arm is operated by the inlet valve lifter for cylinder No. 4. The internal spring of the valve 30 is selected of a proper value to assure correct contact of arms 40 with the lifters at all times. The valves 30 and their corresponding operating arms 40 are mounted to a base plate 43 which is contoured to fit within the space above camshaft 15, under the cover 17, and between the lifters.

The association of valves and operating arms to the different lifters is illustrated in FIG. 7. As explained above, the intake valve lifter for cylinder No. 4 provides appropriate timing for the valve 30 controlling air injection to cylinder No. 1. It will be noted that this relationship carries through, being the displacement (lag) by two in the firing order. Thus, the full arrangement for the V-8 engine is Cylinder No. 1-5-4-2-6-3-7-8
Intake lifter No. 4-2-6-3-7-8-1-5.

The present invention is thus readily adaptable to present day engines, particularly V-8 engines. The entire assembly of valves 30 and control arms 40 can be provided as a unit fitted to the space between, and spacing of, the valve lifters. Much of the conduit 28 can be built into this subassembly. The compressor can easily be mounted on an appropriate bracket and belt driven from the engine, in the same manner as an alternator, air-conditioning compressor, or power steering pump. The necessary connections to and from the compressor, as previously described, can be made with flexible tubing or conduit appropriate to a particular installation.

In the particular engine illustrated the intake valves close at 70° ATDC. This is typical of modern engine design, although it is understood there may be some variation. The important feature is that the intake valve has closed, and the piston is completing, or has completed, its intake stroke when air or gas under pressure is introduced to the cylinder through the pipe 25. The incoming air or gas enters below the TDC position of the piston, and mixes with the previously inducted charge. It would appear that the portion of the inducted fuel-air charge in the lower portion of the cylinder is thus caused to become a leaner mixture, while the fuel-air ratio of the charge at the top of the cylinder, particularly in the region of the spark plug, remains essentially at the ratio of the inducted charge. The engine does not exhibit any tendency to misfire, indicating that the fuel-air ratio around the spark plug is adequate for normal spark ignition. Thus, it appears that the invention achieves in a simple manner, adaptable easily to present design engines, the effects of the stratified charge or "lean burn" engine.

Other arrangements could be utilized to achieve the same results, within the scope of the invention. For example, separate cams or equivalent can be driven in timed relation with cam shaft 15, and pneumatic servo or electrical actuation of the valves 40 can be provided, particularly if somewhat different timing of these valves is desired than is available through mechanical actuation off the engine cam shaft.

While the method herein described and the form of apparatus for carrying this method into effect, constitute preferred embodiments of this invention, it is to be understood that the invention is not limited to this precise method and form of apparatus, and that changes may be made in either without departing from the scope of the invention.

What is claimed is:

1. An Otto cycle internal combustion engine having at least one cylinder and a piston having a head and reciprocable therein through intake, compression, expansion and exhaust strokes, intake and exhaust valves controlling the admission of a charge to said cylinder and the exhaust of products of combustion, and valve operating mechanism having timed relation to piston movement; the improvement comprising
    means forming an inlet into said cylinder separate from the inlet valve and below the top dead center position of the head of said piston,
    means connected to supply gas under pressure to said inlet means,
    an inlet control valve connected between said compressor means and said inlet means to control the timing of gas admission therethrough,
    and operating means actuated in timed relation to said valve operating mechanism and controlling said inlet control valve to open the same during the initial portion of the compression stroke to introduce gas into said cylinder above the piston head and below the charge admitted through said intake valve.

2. The improved internal combustion engine defined in claim 1, wherein said operating means is constructed to initiate opening of said inlet control valve before the end of the intake stroke but after said intake valve is closed.

3. The improved internal combustion engine defined in claim 1, wherein there are a plurality of cylinders and corresponding inlet control valves and operating means, said operating means for each of said inlet control valves deriving its valve opening motion from a cam controlling the inlet/exhaust valve operation for another cylinder.

4. In a multi-cylinder Otto cycle internal combustion piston engine having conventional intake and exhaust valves, a cam shaft, and valve operating mechanism transmitting cam motion to said valves, said mechanism being arrayed along said camshaft; the improvement comprising
    an engine driven compressor,
    inlets entering each of said cylinders independently of said valves below the top dead center position of the corresponding piston head,
    a manifold connected to the outlet of said compressor and extending generally adjacent said cam shaft,
    supplemental air inlet valves connected between said inlets and said manifold,
    sequencing means operable by said camshaft for opening selectively each of said supplemental valves in a sequence whereby the compressor output is connected to each of said inlets during an initial portion of the compression stroke of the piston in the corresponding cylinders,
    and means supporting said sequencing means on said engine adjacent said camshaft.

5. A four-cycle spark ignition internal combustion engine having at least one cylinder and a piston reciprocable therein through intake, compression, expansion and exhaust strokes, intake and exhaust valves controlling the admission of a charge to said cylinder and the exhaust of products of combustion, valve operating mechanism including a cam shaft rotated in timed relation to piston movement, and a spark plug located in the top of said cylinder to ignite a fuel-air charge compressed therein; the improvement comprising
    means forming an inlet into said cylinder separate from the inlet valve, and spaced substantially below the top of said cylinder so as to be covered by said piston at the time of ignition, said inlet being directed into said cylinder below the region of said spark plug whereby gas injected through said inlet does not disturb the inducted mixture in the region of said spark plug, compressor means driven by said engine and connected to supply gas under relatively moderate pressure to said inlet means, an inlet control valve connected between said compressor means and said inlet means to control the timing of admission of gas therethrough, and operating means actuated from said cam shaft and controlling said inlet control valve to open the same during the initial portion of the compression stroke to supercharge said cylinder after said inlet valve is closed and before the admitted charge has been compressed to a high pressure.

6. A method of improving the performance of an Otto cycle spark ignitition internal combustion engine, comprising forcing gas into the engine cylinder after the intake valve has closed and during an initial part of the compression stroke of the piston prior to the spark ignition to supercharge the engine from a relatively moderate pressure source, the gas being injected into the cylinder in a region below top dead center piston position and spaced from the spark plug to avoid leaning of the mixture inducted through the intake valve in the region of the spark plug.

* * * * *